US012316186B2

(12) United States Patent
Ma et al.

(10) Patent No.: US 12,316,186 B2
(45) Date of Patent: May 27, 2025

(54) VIBRATION MOTOR

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Jie Ma, Shenzhen (CN); Zhiyong Cui, Shenzhen (CN); Yao Wang, Shenzhen (CN)

(73) Assignees: AAC Microtech (Changzhou) Co., Ltd., Changzhou (CN); AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 488 days.

(21) Appl. No.: 17/946,069

(22) Filed: Sep. 16, 2022

(65) Prior Publication Data

US 2023/0318424 A1    Oct. 5, 2023

(30) Foreign Application Priority Data

Apr. 1, 2022    (CN) .......................... 202220767900.9

(51) Int. Cl.
 *H02K 33/16*    (2006.01)
(52) U.S. Cl.
 CPC .................................... *H02K 33/16* (2013.01)

(58) Field of Classification Search
 CPC ...................................................... H02K 33/16
 USPC ............................................ 310/28; 335/252
 See application file for complete search history.

(56) References Cited

U.S. PATENT DOCUMENTS

| | | | |
|---|---|---|---|
| 10,158,278 B2 * | 12/2018 | Mao | H02K 33/16 |
| 10,307,790 B2 * | 6/2019 | Pu | B06B 1/045 |
| 10,486,196 B2 * | 11/2019 | Chai | B06B 1/045 |
| 11,316,419 B2 * | 4/2022 | Ling | H02K 33/18 |
| 2017/0012517 A1 * | 1/2017 | Huang | H02K 33/00 |
| 2019/0207498 A1 * | 7/2019 | Mao | H02K 35/02 |
| 2020/0212777 A1 * | 7/2020 | Tao | H02K 33/06 |
| 2021/0211030 A1 * | 7/2021 | Li | H02K 33/18 |

\* cited by examiner

*Primary Examiner* — Alexander Talpalatski
(74) *Attorney, Agent, or Firm* — Wiersch Law Group

(57) ABSTRACT

The present disclosure discloses a linear motor having a housing with an receiving space, a vibration unit and a stator unit received in the receiving space. The vibrator unit includes a weight and an elastic member fixed to the weight. The elastic member includes a first fixation portion fixed to the weight and a second fixation portion fixed to the housing. At least one soldering plate fixed to at least one of the first fixation portion and the second fixation portion. The soldering plate includes a rectangle portion and the extending portion having a smaller width than the rectangle portion. The vibration motor has higher fatigue life and high reliability.

10 Claims, 4 Drawing Sheets

1

VIBRATION MOTOR

FIELD OF THE PRESENT DISCLOSURE

The present disclosure relates to tactile feedback technologies, especially relates to a vibration motor applied in mobile device.

DESCRIPTION OF RELATED ART

With the development of electronic technologies, portable consumable electronic products are increasingly popular, such as mobile phone, hand-held game console, navigating device or hand-held multimedia entertainment equipment, in which a vibration motor is generally used for system feedback, such as call reminder, message reminder, navigation reminder of mobile phone, vibration feedback of game console. To meet the demand of such a wide application, the vibration motor shall have high performance and long life.

A vibration motor of related art includes a housing with an receiving space, a vibration unit received in the receiving space and a stator unit fixed on the housing. The vibration unit usually includes a weight and an elastic member fixed to the weight via a soldering plate.

However, in the vibration motor in the related art, the soldering plate is in a rectangle shape. The soldering surface between the elastic member and the soldering plate is accordingly rectangular, which may result in stress concentration on edge of the soldering plate. In this situation, the fatigue life of an edge portion of the elastic member may be decreased, thus resulting in fracture of the elastic member and reducing the reliability of the vibration motor.

Therefore, it is necessary to provide an improved vibration motor to overcome the problems mentioned above.

SUMMARY OF THE INVENTION

The present disclosure provides a vibration motor with higher fatigue life and higher reliability.

The vibration motor includes a housing with an receiving space; a vibration unit received in the receiving space, including: a weight; a first driving member fixed to the weight; and an elastic member configured to suspend the weight in the receiving space, including: a first fixation portion fixed to the weight; a second fixation portion fixed to the housing; and a connection portion connecting the first fixation portion and the second fixation portion; a stator unit received in the receiving space and comprising a second driving member facing the first driving member; at least one soldering plate fixed to at least one of the first fixation portion and the second fixation portion, including: a rectangle portion having a first width; and an extending portion extending from the rectangle portion and having a second width smaller than the first width.

Further, the rectangle portion includes a pair of first sides parallel to each other and a pair of second sides perpendicular with the first side; the extending portion extends from one of the first side along a direction parallel to the second side and away from the other first side.

Further, the extending portion includes a third side parallel to the first side; a vertical distance between the third side and its adjacent first side is greater than 0.2 mm.

Further, a vertical distance between an endpoint of the third side and the second side is greater than 0.5 mm.

Further, the third side includes two endpoints; each endpoint has an equal vertical distance to its adjacent second side.

Further, the extending portion is in a trapezoid shape.

Further, the soldering plate is located on a side of the first fixation portion away from the weight.

Further, the soldering plate is located on a side of the second fixation portion away from the housing.

Further, the weight includes a fixation protrusion fixed to the first fixation portion; along a thickness direction of the soldering plate, a projection of the soldering plate overlaps with a projection of the fixation protrusion.

Further, the first side extends along a long axis of the rectangle portion, the second side extends along a short axis of the rectangle portion.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
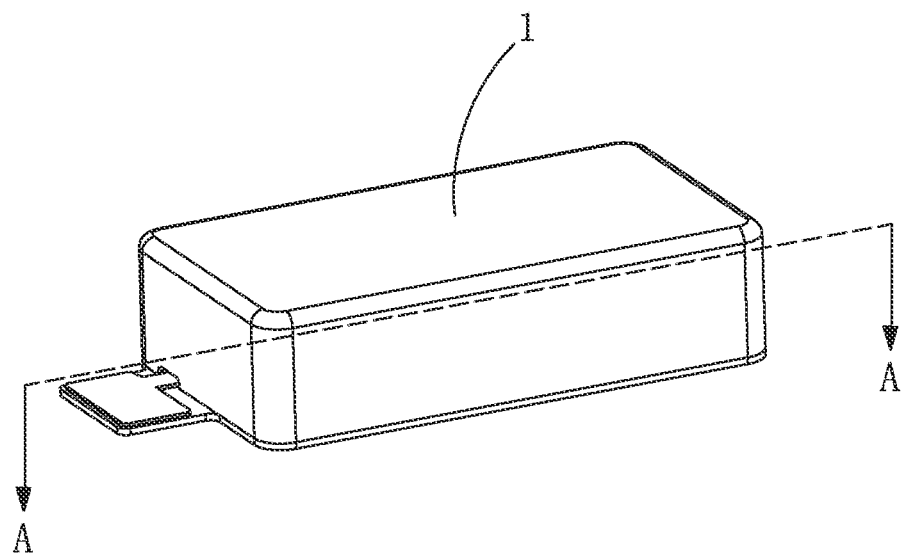
FIG. 1 is an isometric view of a vibration motor in accordance with an exemplary embodiment of the present disclosure.
Figure 2:
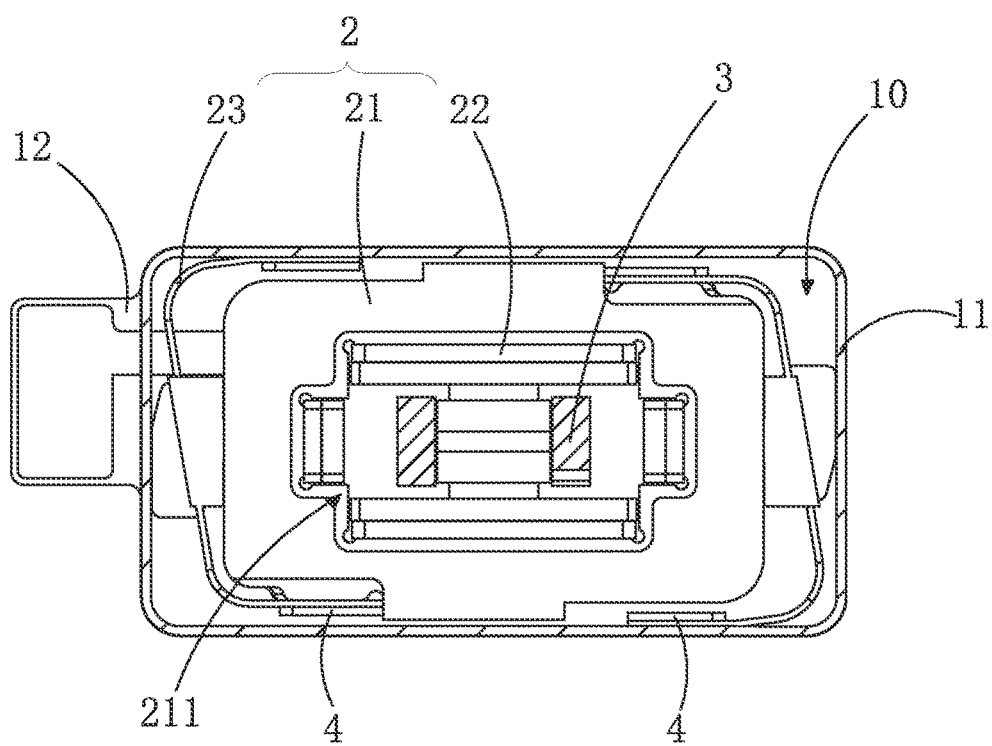
FIG. 2 is a cross-sectional view of the vibration motor taken along line A-A in FIG. 1.
Figure 3:
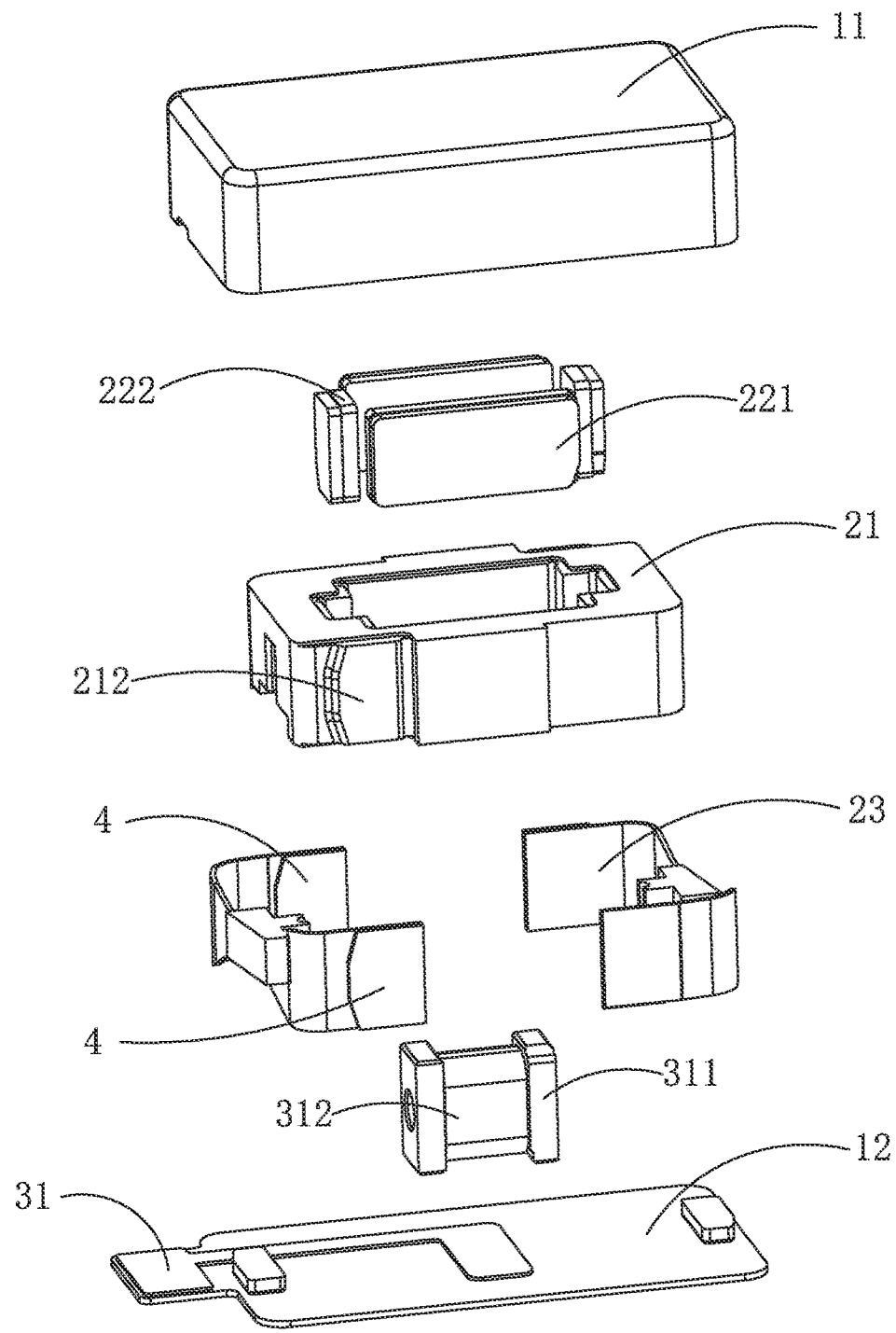
FIG. 3 is an exploded view of the vibration motor in FIG. 1.
Figure 4:
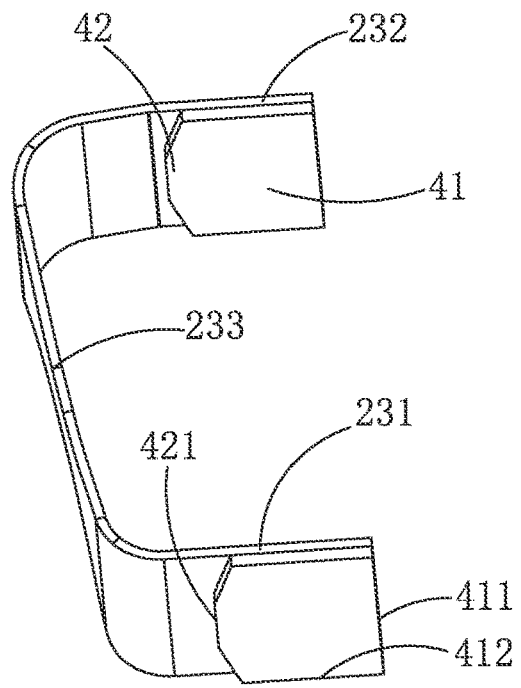
FIG. 4 is an isometric view of an assembly of an elastic member and a soldering plate of the vibration motor in FIG. 1.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-5 together, a vibration motor 100 provided by an exemplary embodiment of the present disclosure includes a housing 1 with an receiving space 10, a vibration unit 2 and a stator unit 3 both received in the receiving space 10.

The housing 1 includes an upper cover 11 and a bottom cover 12 fixed to the upper cover 21 and enclosing the receiving space 10 with the upper cover 11. The stator unit 3 is fixed to the bottom cover 12.

The vibration unit 2 includes a weight 21, a first driving member 22 fixed to the weight 21 and an elastic member 23 configured to suspend the weight 21 in the receiving space 10. Specifically, a through hole 211 is provided on the weight 21; the first driving member 22 includes a magnetic plate 221 received in the through hole 211 and fixed to the weight 21, and a magnet 222 fixed to the magnetic plate 221.

The stator unit 3 includes a second driving member 31 facing the first driving member 22. The second driving member 31 includes an iron core 311 and a coil 312 wound around the iron core 311. The iron core 311 is fixed to the bottom cover 12 and extends into the through hole 211 to face the magnet 222. The coil 312 and the iron core 311 are both spaced apart from the magnet 222. The stator unit 2 further includes a FPC (flexible printed circuit board) 31 fixed to the bottom cover 12 and electrically connecting with the coil 312. The coil 312 is electrically activated to interact with the magnet 222 so that the elastic member 23 drives the weight 21 to reciprocate along a vibration direction, by which provides vibration feedback.

In this embodiment, the elastic member 23 includes a first fixation portion 231 fixed to the weight 21, a second fixation portion 232 fixed to the upper cover 11, and a connection portion 233 connecting the first fixation portion 231 and the second fixation portion 232. The vibration motor 100 further includes a soldering plate 4 fixed to the first fixation portion 231 and the second fixation portion 232. It can be understood that there are two soldering plates 4. One of the soldering plates 4 is located on a side of the first fixation portion 231 away from the weight 21, and the other is located on a side of the second fixation portion 232 away from the upper cover 11.

Please refer to FIG. 2-FIG. 5, the soldering plate 4 includes a rectangle portion 41 having a first width and an extending portion 42 extending from the rectangle portion 41. The extending portion 42 has a second width smaller than the first width.

Figure 5:
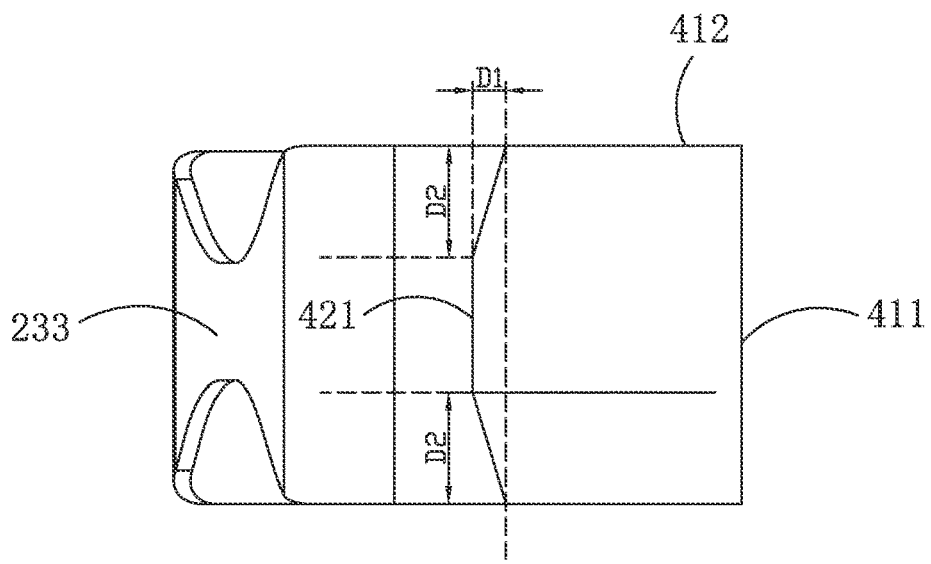
FIG. 5 is a side view of an assembly of an elastic member and a soldering plate of the vibration motor in FIG. 1.

As shown in FIG. 5, the rectangle portion 41 includes a pair of first sides 411 parallel to each other and a pair of second sides 412 perpendicular with the first side 411. The extending portion 42 extends from one of the first side 411 along a direction parallel to the second side 412 and away from the other first side 411. Furthermore, the extending portion 42 includes a third side 421 parallel to the first side 41. A vertical distance D1 between the third side 421 and its adjacent first side 411 is greater than 0.2 mm. Moreover, a vertical distance D2 between an endpoint of the third side 421 and the second side 412 is greater than 0.5 mm. More specifically, the third side 412 includes two endpoints; each endpoint has an equal vertical distance D2 to its adjacent second side 412. In this way, the extending portion 42 is accordingly in a trapezoid shape.

In this embodiment, along a direction parallel to the first side 411, a width of the rectangle portion 41 is equal to a width of the first fixation portion 231. That is to say, a length of the first side 41 is equal to the width of the first fixation portion 231. In this situation, the soldering plate 4 totally covers the first fixation portion 231. As shown in FIG. 5, the first side 411 extends along a long axis of the rectangle portion 4, the second side 412 extends along a short axis of the rectangle portion 41. During manufacture and application, many microscopic manufacturing defects occur on edge of the elastic member 23 after trimming. Thus, the edge of the elastic member 23 becomes the source of fatigue cracks. In the present invention, the extending portion 42 has a smaller width than the rectangle portion 41. Along a direction from the first fixation portion 231 towards the connection portion 233, a width difference reduces the stress concentration on the edge of the elastic member 23 close to the soldering plate 4, thus transforming the stress concentration to the middle part of the elastic member 23 and further reducing the risk of fatigue fracture of the elastic member 23.

Accordingly, the weight 21 includes a fixation protrusion 212 fixed to the first fixation portion 231; along a thickness direction of the soldering plate 4, a projection of the soldering plate 4 totally overlaps with a projection of the fixation protrusion 212. In this way, the fixation protrusion 212 has a same shape with the extending portion 42 so that the first fixation portion 231 is uniformly sandwiched between the soldering plate 4 and the fixation protrusion 212.

Compared with the related art, in the vibration motor of the present disclosure, at least one soldering plate is fixed to at least one of the first fixation portion and the second fixation portion of the elastic member. The soldering plate includes a rectangle portion having a first width and an extending portion extending from the rectangle portion. The extending portion has a second width smaller than the first width. By decreasing the width of the extending portion, the stress concentration on the edge of the elastic member is effectively reduced, thus decreasing the stress on the edge, improving the fatigue life of the elastic member, decreasing the risk of fatigue fracture of the elastic member during manufacture and application, and further optimizing the reliability of the vibration motor.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
    a housing with an receiving space;
    a vibration unit received in the receiving space, comprising:
        a weight;
        a first driving member fixed to the weight; and
        an elastic member configured to suspend the weight in the receiving space, comprising:
            a first fixation portion fixed to the weight;
            a second fixation portion fixed to the housing; and
            a connection portion connecting the first fixation portion and the second fixation portion;
    a stator unit received in the receiving space and comprising a second driving member facing the first driving member;
    at least one soldering plate fixed to at least one of the first fixation portion and the second fixation portion, comprising:
        a rectangle portion having a first width; and
        an extending portion extending from the rectangle portion and having a second width smaller than the first width.

2. The vibration motor as described in claim 1, wherein the rectangle portion comprises a pair of first sides parallel to each other and a pair of second sides perpendicular with the first side; the extending portion extends from one of the first side along a direction parallel to the second side and away from the other first side.

3. The vibration motor as described in claim 2, wherein the extending portion comprises a third side parallel to the first side; a vertical distance between the third side and its adjacent first side is greater than 0.2 mm.

4. The vibration motor as described in claim 3, wherein a vertical distance between an endpoint of the third side and the second side is greater than 0.5 mm.

5. The vibration motor as described in claim 4, wherein the third side comprises two endpoints; each endpoint has an equal vertical distance to its adjacent second side.

6. The vibration motor as described in claim 5, wherein the extending portion is in a trapezoid shape.

7. The vibration motor as described in claim 1, wherein the soldering plate is located on a side of the first fixation portion away from the weight.

8. The vibration motor as described in claim 1, wherein the soldering plate is located on a side of the second fixation portion away from the housing.

9. The vibration motor as described in claim 1, wherein the weight comprises a fixation protrusion fixed to the first fixation portion; along a thickness direction of the soldering plate, a projection of the soldering plate overlaps with a projection of the fixation protrusion.

10. The vibration motor as described in claim 2, wherein the first side extends along a long axis of the rectangle portion, the second side extends along a short axis of the rectangle portion.

* * * * *